UNITED STATES PATENT OFFICE.

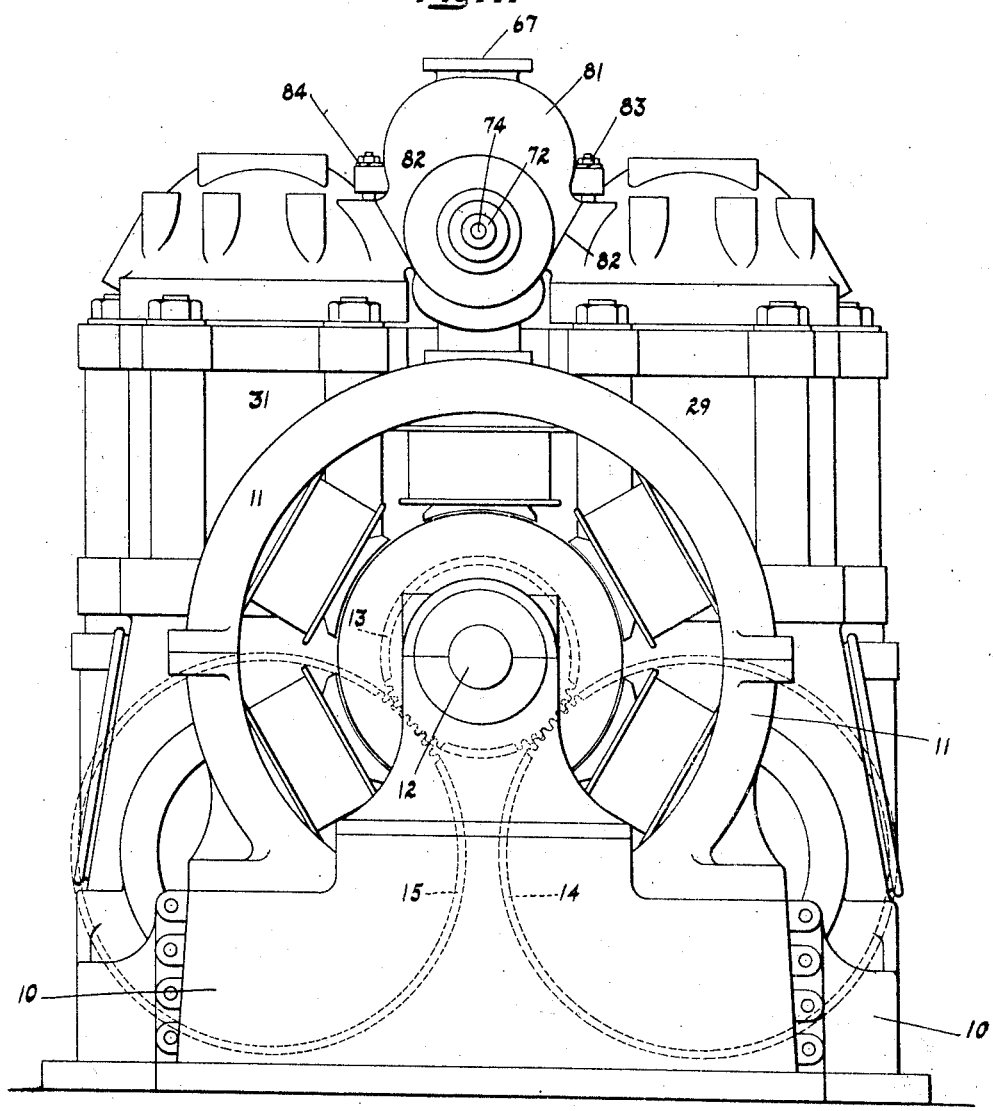

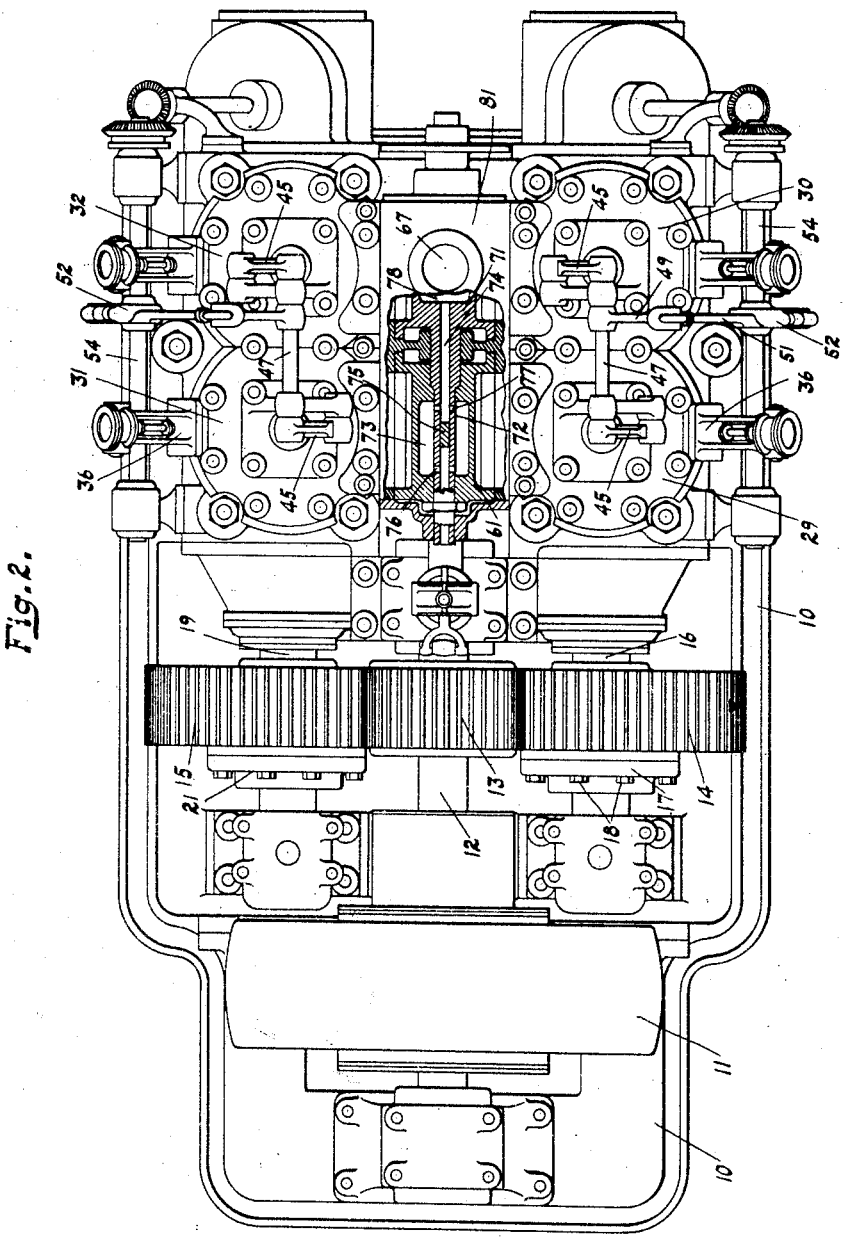

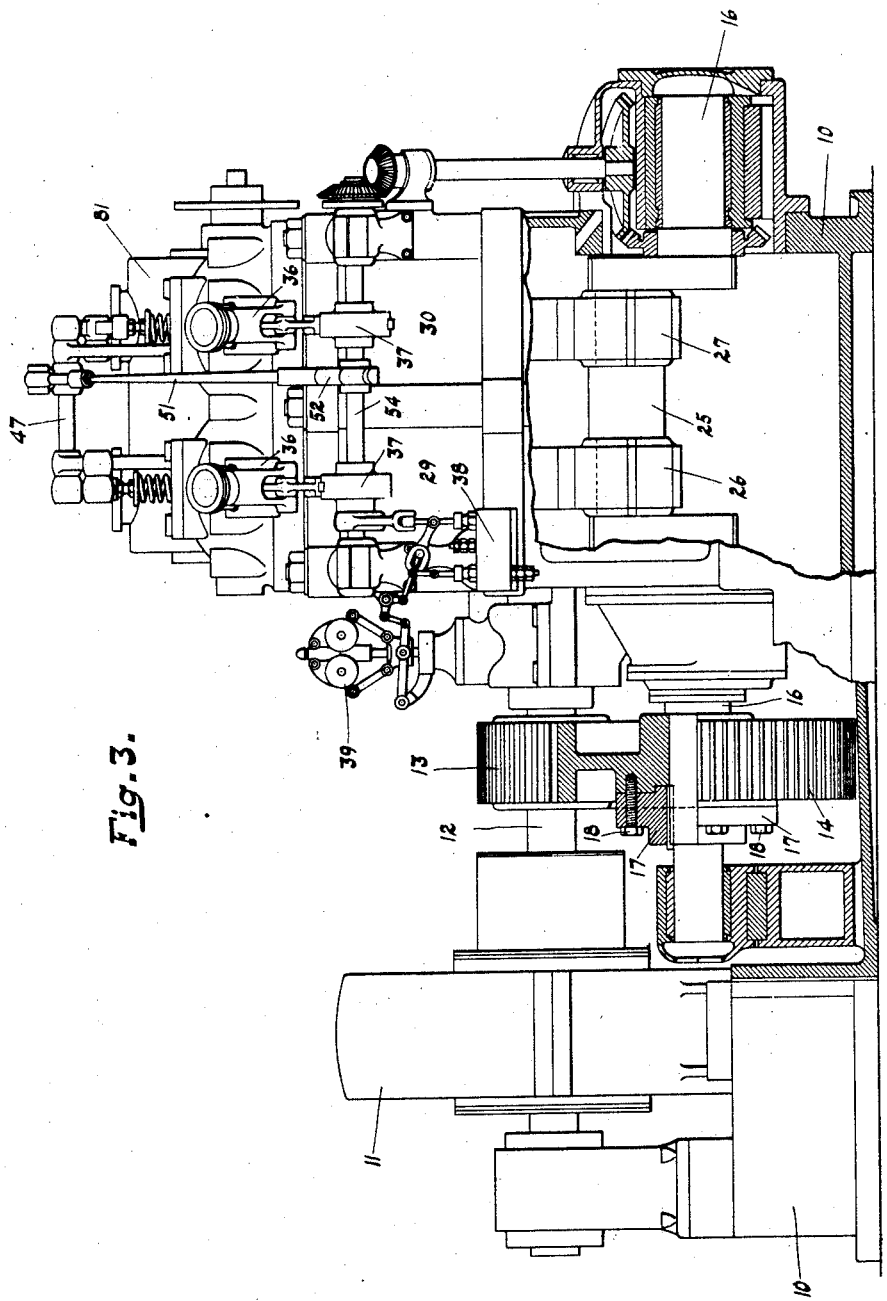

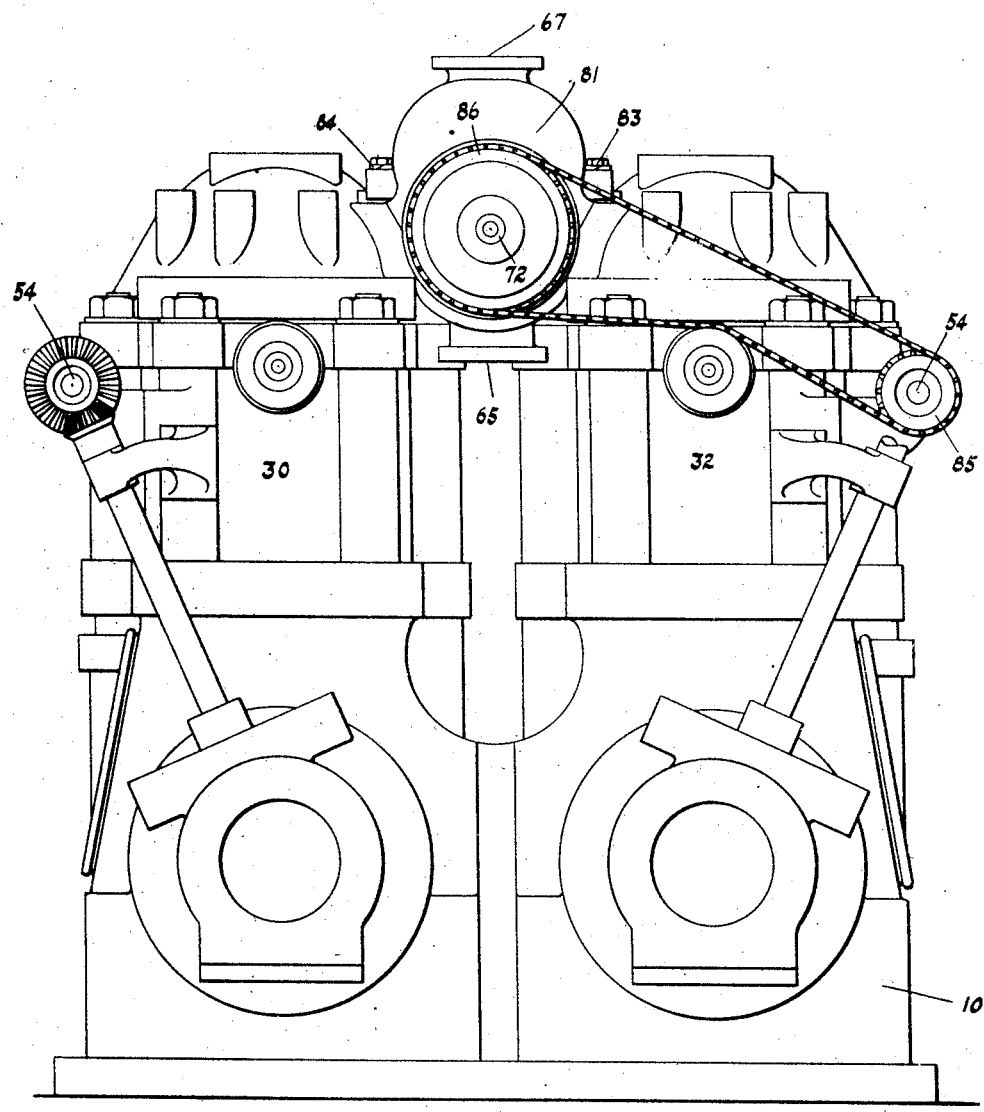

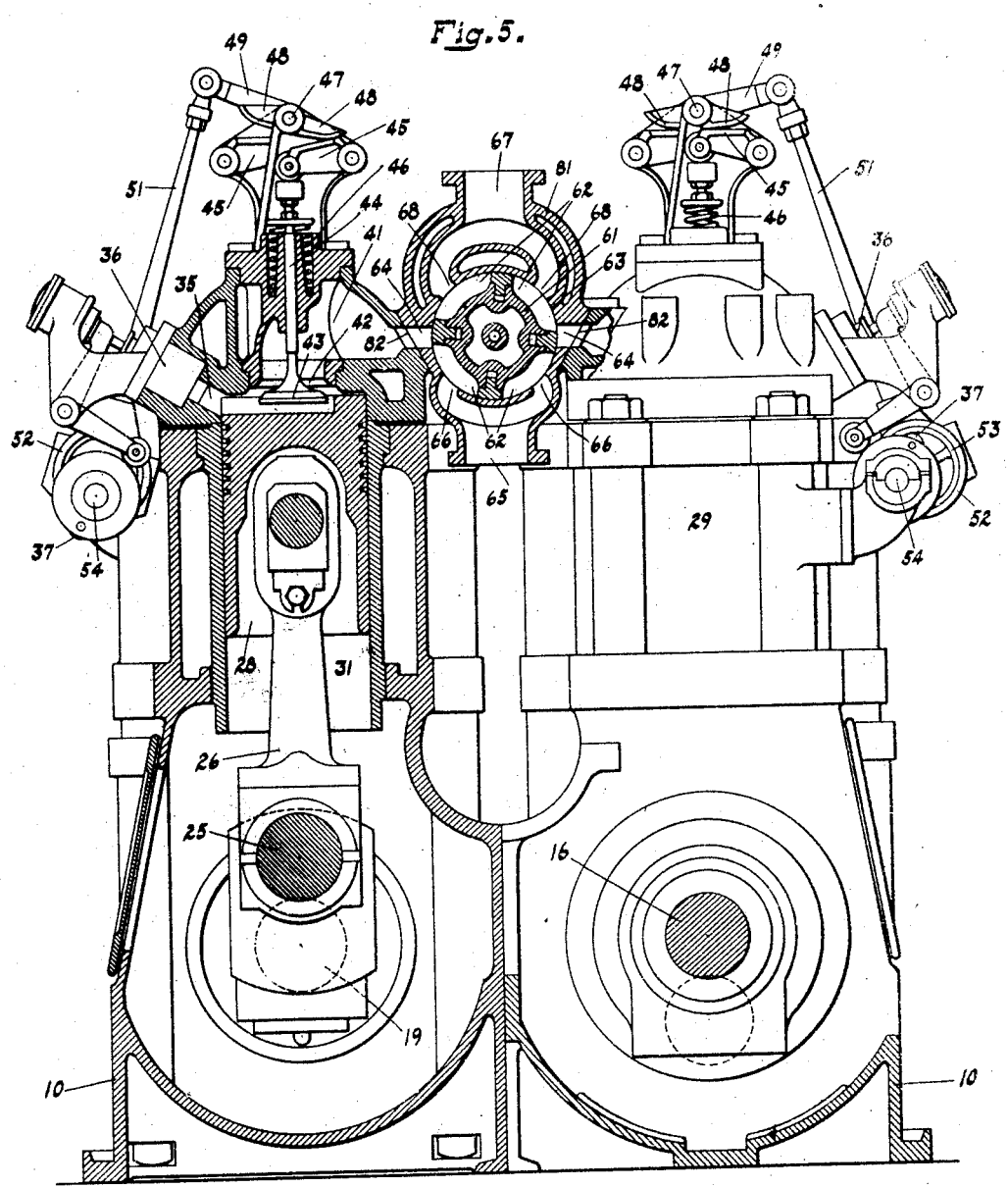

NORMAN McCARTY, OF INDIANAPOLIS, INDIANA, ASSIGNOR TO ATLAS ENGINE WORKS, OF INDIANAPOLIS, INDIANA, A CORPORATION OF INDIANA.

POWER PLANT.

990,152.

Specification of Letters Patent.   Patented Apr. 18, 1911.

Application filed December 18, 1909.   Serial No. 533,865.

*To all whom it may concern:*

Be it known that I, NORMAN MCCARTY, a citizen of the United States, residing at Indianapolis, in the county of Marion and State of Indiana, have invented a certain new and useful Power Plant, of which the following is a specification.

At the present time an effort is being made to equip existing steam railroads with single car transporting units which can be run at comparatively short intervals without the provision of overhead trolley wires or third rails, and considerable difficulty has been experienced in providing a power plant of such character and of a capacity capable of properly handling the car at all desired speeds without taking up so much room in the car as to unprofitably limit the passenger or freight carrying space.

The object of my present invention is to produce a power plant, especially designed for the above mentioned use, but not necessarily limited to such use in which there is provided, within a very compact volume and limited floor space, an electric generator or other transmission medium and a pair of internal combustion engine units so arranged with relation to each other and to the generator that they may be used simultaneously for driving the car at high speeds or, in case of accident to one or the other of the units, the working unit may nevertheless be utilized for bringing the car, at reduced speed, to the home station. To this end I have provided, among other details of construction, an improved arrangement of valves by means of which a single valve, moving at unusually low speed, will serve to control the induction and eduction to and from the combustion chamber, a distributing valve being associated therewith outside of the combustion chamber and therefore free from the pressures existing within said chamber. The low speed of the valve mechanism enables the use of an engine of the highest rotary speed, reducing the floor space required and the weight of the unit. Other details of construction have also been provided which will be hereinafter pointed out.

The accompanying drawings illustrate my invention.

Figure 1 is an end elevation of the generator end of a plant embodying my invention; Fig. 2 a plan with one of the directing valves shown in horizontal section; Fig. 3 a side elevation in fragmentary vertical section; Fig. 4 an end elevation of the engine end, the valve gear, however being omitted, as it is fully shown in Fig. 5, and Fig. 5 a partial vertical section through one of the engine cylinders.

In the drawings 10 indicates a suitable supporting frame having mounted thereon an electric generator 11 of any desired type and capable of producing that class of current which may be desired. It is preferable, however, that the generator be of the high speed type in order that it may be as small and as light as possible. The shaft 12 of generator 11 carries a pinion 13 which is meshed with a pair of gears 14 and 15 which are arranged upon opposite sides of shaft 12 and preferably parallel therewith. Gear 14 is journaled upon crank shaft 16 and may be positively but detachably connected therewith by means of a clutch head 17 firmly keyed to the shaft and carrying a plurality of bolts 18 which may be extended into gear 14 as clearly shown in Fig. 3. Of course any other desirable form of clutch, or disconnectible connection, may be used but on the whole I believe that the construction shown is probably the most simple and efficient. Similarly gear 15 is journaled upon a crank shaft 19 and connected thereto by means of a clutch 21, like the clutch 17. The gears 13, 14 and 15 are preferably spur gears and in that case shafts 16 and 19 will be parallel with shaft 12 but a substitution of bevel gears would not depart from the spirit of my invention.

In order to provide high-power yet compact engine units for independently driving the two shafts 16 and 19, I have provided the following construction: Each crank shaft is provided with a single crank 25 upon which are mounted two pitmen 26 and 27 and to each of these is secured a piston 28. Two pairs of cylinders 29, 30 and 31, 32 are therefore provided, one for each piston, and the crank of shaft 19 is set 180° from the crank of shaft 16, as indicated in dotted lines in Fig. 5.

The particular engines shown in the drawings are of the slow burning internal combustion type and therefore I provide a fuel inlet 35 leading into each cylinder, said fuel inlet being controlled by an atomizer and valve 36 of any well known type, the valve of which is controlled by the usual cams 37, one for each atomizer. The fuel is delivered to the several atomizers by means of a suitable measuring pump 38 the delivery of which is controlled by a speed controlled governor 39, the details of which, however, do not form any part of my present invention.

Leading into the upper end of each cylinder is a large passage 41 having an inwardly opening valve seat 42 at its inner end, this passage being made as large as possible relative to the internal diameter of the cylinder. Coöperating with the valve seat 42 is an inwardly opening valve 43, the stem 44 of which projects outwardly in position to be engaged by a lever 45, the valve being normally held closed and in engagement with the lever by means of a spring 46. Journaled above each pair of levers 45 is a rock shaft 47 carrying a pair of wiper arms 48, 48 adapted to alternately engage the two levers 45 and the rock shaft is rocked by means of a lever 49 and an arm 51 which arm is carried by an eccentric strap 52 mounted upon an eccentric 53 carried by the cam shaft 54. The other pair of cylinders is similarly equipped with valves and operating means, the eccentric 53 for this pair being so adjusted in phase that the movement of the valves controlled thereby will correspond to the movement of the pistons.

The pistons of the pair of cylinders 29 and 30 are one half a cycle apart, being mounted upon the same crank, while the pistons of the other pair of cylinders 31 and 32 are similarly one half a cycle apart but, as compared with the pistons of cylinders 29 and 30, respectively, they are one fourth of a cycle apart so that, assuming the piston 28 of cylinder 29 to be at the beginning of its suction stroke or end of its exhaust stroke, the piston in cylinder 31 will be at the beginning of its exhaust stroke, the piston of cylinder 30 will be at the beginning of its power stroke, and the piston of cylinder 32 will be at the beginning of its compression stroke.

The passage 41 of each cylinder serves not only as an inlet for air (or an inlet for carbureted air in an engine of the explosion type) but also serves as an outlet for the exhaust gases and therefore, in order to properly distribute the two sets of gases I mount between the opposed cylinders 29 and 31, a rotary valve 61 provided with a plurality of pockets 62. Valve 61 is rotatably mounted in a valve chamber 63 provided with a pair of ports 64 which lead in opposite directions to the passages 41 of cylinders 29 and 31. Leading into chamber 63 is an admission passage 65 which is preferably provided with a pair of discharge ports 66 which form the communication between the admission passage and the valve chamber. This bifurcation of the passages might be avoided but the arrangement shown is probably better. Leading from the valve chamber 63 is an exhaust passage 67, the inner end of which is preferably bifurcated to form ports 68, 68. Similarly I provide a rotary valve 71 between the two cylinders 30 and 32, said distributing valve being of the same construction as valve 61.

It may be desirable to watercool these valves and for that purpose the construction shown in Fig. 2 may be used. Here the valve 61 is provided with a hollow shaft 72 upon which valve 71 is secured, and valve 61 is provided with an internal annular chamber 73 surrounding the stem 72. Stem 72 is provided with a central bore 74 to the outer end of which a suitable water supply may be connected and within the bore 74 is a block or obstruction 75, passages 76 forming an inlet from bore 74 into chamber 73 and passages 77 forming an outlet from said chamber into said bore, the bore delivering into a chamber 78 in valve 71, from whence the cooling water may issue at the opposite end of the valve.

The distributing valves are mounted in a valve casing 81 in which the inlet and exhaust passages are formed and, in order to compensate the expansion and contraction between the opposed sets of cylinders I form, around passages 41 and 64, mating surfaces 82 which are inclined from the medial plane of the structure somewhere in the neighborhood of 30° so that the surfaces 82 of the valve structure will form a wedge fitting between the V-shaped opening between the surfaces 82 of the cylinder heads. This structure may then be held in place by bolts 83 beneath which compressible washers 84 may be placed so as to maintain the joint.

The distributing valves, in the form shown in the drawings, need only be rotated once for each four revolutions of the crank shafts and therefore I secure to one of the cam shafts 54 a sprocket wheel 85 which is half the diameter of the sprocket wheel 86 secured to the shaft 72 of the distributing valves.

The operation is as follows: With the parts in the position shown in Fig. 5, piston 28 is starting on its suction stroke, valve 43 is starting on its closing stroke and valve 61 is in position where communication is just being established between the admission passage 65 and the passage 41 of cylinder 31 so that, as the piston 28 moves downwardly, valve 43 will move toward closing position and air will be drawn into the cylinder 31 until valve 43 closes at about or slightly after the completion of the suction stroke of the piston 28. At the same time valve 61 is establishing and maintaining a connection between passage 41 of the cylinder 31 and the exhaust passage 67, the valve 43 of this cylinder moving in its opening stroke. At the same time the piston of cylinder 30 will be moving downwardly on its power stroke and valve 71 will establish communication between the admission passage and the passage 41 of cylinder 30, but the valve 43 of said cylinder will be closed so that there will be no movement through the said passage 41. At the same time the piston in cylinder 32 will be moving upwardly on its compression stroke and valve 71 will have established a communication between the passage 41 of said cylinder and the exhaust passage, but the valve 43 of said cylinder 32 will be closed and there will therefore be no movement past said valve.

It will be noticed that the movement of valve 41 is comparatively very slow for the reason it begins to open at the beginning of the exhaust stroke of the piston and does not close until the end of the admission stroke of the piston; equal in time to a complete revolution of the crank shaft and allows of a very much higher rotary speed on the engine than if compelled to complete its cycle in one half of a revolution as is its usual practice.

The increase in rotative speed allows the use of a smaller and lighter engine which is essential for the purpose for which the engine is designed.

I claim as my invention:

1. In an internal combustion engine a combined inlet-and-exhaust valve giving access to and exhaust from the cylinder and closed during power stroke of the piston, means for intermittently opening and closing said valve, and a distributing valve arranged beyond the inlet-and-exhaust valve, means for moving said distributing valve to alternately establish and disestablish connection between air supply and exhaust passages and a passage controlled by the inlet-and-exhaust valve, and liquid fuel injecting means discharging into said cylinder through a passage independent of the inlet-and-exhaust valve.

2. In an internal combustion engine a combined inlet-and-exhaust valve giving access to and exhaust from the cylinder and closed during power stroke of the piston, and a rotary distributing valve arranged beyond the inlet-and-exhaust valve, means for moving said distributing valve to alternately establish and disestablish connection between air supply and exhaust passages and a passage controlled by the inlet-and-exhaust valve, and liquid fuel injecting means discharging into said cylinder through a passage independent of the inlet-and-exhaust valve.

3. In an internal combustion engine, the combination of two cylinders and associated pistons, each having a passage giving both inlet and exhaust to its cylinder, two inlet-and-exhaust valves, each arranged between one of said passages and its cylinder and giving access to and exhaust from its cylinder and closed during power stroke of the piston, means for intermittently opening and closing said valves, a rotary distributing valve arranged beyond the inlet-and-exhaust valves and movable to establish and disestablish connection between said inlet-and-exhaust passages and air-supply and exhaust passages successively, and liquid fuel injecting means discharging into the said cylinder through a passage independent of the inlet-and-exhaust valve.

4. In an internal combustion engine, the combination of two cylinders and associated pistons, each having a passage giving both inlet and exhaust to its cylinder, two inlet-and-exhaust valves, each arranged between one of said passages and its cylinder and giving access to and exhaust from its cylinder and closed during power stroke of the piston, means for intermittently opening and closing said valves, and a rotary distributing valve arranged beyond the inlet-and-exhaust valves and movable to establish and disestablish connection between said inlet-and-exhaust passages and air-supply and exhaust passages successively.

5. In an internal combustion engine, the combination of two cylinders and associated pistons, each having a passage giving both inlet and exhaust to its cylinder, two inlet-and-exhaust valves each arranged between one of said passages and its cylinder and giving access to and exhaust from its cylinder and closed during power stroke of the piston, a valve chamber with which the inlet-and-exhaust passage of each cylinder communicates, a rotary valve mounted in said chamber and provided with a multiplicity of circumferentially arranged pockets, each adapted to establish communication with an air-supply and the inlet-and-exhaust passages, and with said inlet-and-exhaust passages and an exhaust passage, successively, and liquid fuel injecting means discharging into the said cylinder through a passage independent of the inlet-and-exhaust valve.

6. In an internal combustion engine, the combination of two cylinders and associated pistons each having a passage giving both inlet and exhaust to its cylinder, two inlet-and-exhaust valves each arranged between one of said passages and its cylinder and giving access to and exhaust from its cylinder and closed during power stroke of the piston, a valve chamber with which the inlet-and-exhaust passage of each cylinder communicates, and a rotary valve mounted in said chamber and provided with a multiplicity of circumferentially arranged pocket each adapted to establsh communication with a supply and the inlet-and-exhaust passages, and with said inlet-and-exhaust passages and an exhaust passage, successively.

In witness whereof, I have hereunto set my hand and seal at Indianapolis, Indiana, this fifteenth day of December, A. D. one thousand nine hundred and nine.

NORMAN McCARTY. [L. S.]

Witnesses:
ARTHUR M. HOOD,
THOMAS W. McMEANS.

Copies of this patent may be obtained for five cents each, by addressing the "Commissioner of Patents, Washington, D. C."